United States Patent
Basler et al.

(10) Patent No.: US 10,493,862 B2
(45) Date of Patent: Dec. 3, 2019

(54) METHOD FOR CONTROLLING THE POWER OUTPUT OF AN ELECTRICAL BATTERY DEVICE OF AN ELECTRICALLY DRIVEN VEHICLE

(71) Applicant: Dr. Ing. h.c. F. Porsche Aktiengesellschaft, Stuttgart (DE)

(72) Inventors: Alexander Basler, Karlsruhe (DE); Simone Faerber, Fellbach (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 65 days.

(21) Appl. No.: 15/695,026

(22) Filed: Sep. 5, 2017

(65) Prior Publication Data
US 2018/0215281 A1    Aug. 2, 2018

(30) Foreign Application Priority Data
Feb. 2, 2017    (DE) .......................... 10 2017 102 054

(51) Int. Cl.
*B60L 58/10*    (2019.01)
*B60W 20/13*    (2016.01)
(Continued)

(52) U.S. Cl.
CPC .............. *B60L 58/10* (2019.02); *B60L 58/21* (2019.02); *B60R 16/033* (2013.01); *B60W 10/26* (2013.01);
(Continued)

(58) Field of Classification Search
CPC ... B60W 20/12; B60W 20/13; B60L 11/1851; B60L 11/1864; B60L 11/187; B60L 11/1872; B60L 58/10
See application file for complete search history.

(56) References Cited

U.S. PATENT DOCUMENTS

| 9,669,820 B1* | 6/2017 | Conlon ................. B60W 10/06 |
| 2008/0036587 A1* | 2/2008 | Meinzen ................. G01S 19/04 340/539.13 |

(Continued)

FOREIGN PATENT DOCUMENTS

| DE | 102010016328 A1 | 10/2011 |
| DE | 102013110346 A1 * | 4/2014 |

(Continued)

OTHER PUBLICATIONS

Formula1 dictionary, "Traction circle", Internet Archive date Sep. 10, 2012, 3 pages (4 pages with Internet Archive date record) (Year: 2012).*

(Continued)

*Primary Examiner* — Behrang Badii
*Assistant Examiner* — David A Testardi
(74) *Attorney, Agent, or Firm* — Leydig, Voit & Mayer, Ltd.

(57) ABSTRACT

A method for controlling a power output of an electrical battery device of an electrically driven vehicle includes determining a route profile of a circular route for the vehicle; ascertaining at least one reduction section of the route profile with a reduced power demand; and reducing the power output of the electrical battery device when passing through the at least one reduction section.

11 Claims, 2 Drawing Sheets

(51) Int. Cl.
  *B60R 16/033* (2006.01)
  *B60W 10/26* (2006.01)
  *H01M 10/48* (2006.01)
  *B60L 58/21* (2019.01)
  *H01M 10/44* (2006.01)

(52) U.S. Cl.
  CPC ............ *B60W 20/13* (2016.01); *H01M 10/48* (2013.01); *H01M 10/44* (2013.01); *H01M 2220/20* (2013.01); *Y02T 10/7005* (2013.01); *Y02T 10/7061* (2013.01); *Y02T 10/92* (2013.01)

(56) References Cited

U.S. PATENT DOCUMENTS

| | | | | |
|---|---|---|---|---|
| 2008/0183348 | A1* | 7/2008 | Arita | B60W 10/06 701/22 |
| 2010/0019718 | A1* | 1/2010 | Salasoo | B60L 3/0046 320/103 |
| 2011/0196557 | A1* | 8/2011 | Hennings | B60K 6/28 701/22 |
| 2011/0246011 | A1* | 10/2011 | Meyer-Ebeling | B60W 10/08 701/22 |
| 2013/0274952 | A1* | 10/2013 | Weslati | B60W 50/0097 701/1 |
| 2015/0274028 | A1* | 10/2015 | Payne | B60L 11/1861 701/22 |
| 2015/0274030 | A1* | 10/2015 | Payne | B60L 11/1874 701/22 |
| 2017/0074193 | A1* | 3/2017 | White | F02D 41/0225 |
| 2017/0267227 | A1* | 9/2017 | Muhlfeld | B60W 50/0097 |
| 2017/0282746 | A1* | 10/2017 | Baraszu | B60L 11/1864 |
| 2018/0136004 | A1* | 5/2018 | Engelhardt | G01C 21/3655 |
| 2018/0141552 | A1* | 5/2018 | Marcicki | H01M 10/625 |
| 2018/0201250 | A1* | 7/2018 | D'Amato | B60W 20/12 |
| 2018/0222467 | A1* | 8/2018 | Kaun | B60W 20/12 |

FOREIGN PATENT DOCUMENTS

| | | | | |
|---|---|---|---|---|
| DE | 102013215519 | A1 | | 2/2015 |
| DE | 102016122001 | A1 | * | 5/2018 |
| JP | 10336801 | A | * | 12/1998 |
| JP | 2004324613 | A | | 11/2004 |
| JP | 2004364350 | A | * | 12/2004 ............ B60L 3/0046 |
| JP | 2007183205 | A | * | 7/2007 ............ B60L 3/0046 |
| JP | 2008019843 | A | * | 1/2008 |
| JP | 2012096712 | A | * | 5/2012 |

OTHER PUBLICATIONS

Race & Track Driving article, "Getting on power", Feb. 4, 2013, 5 pages (Year: 2013).*

Lot, Roberto et al., "Lap Time Optimization of a Sports Series Hybrid Electric Vehicle", Proceedings of the World Congress on Engineering 2013 vol. III, WCE 2013, Jul. 3-5, 2013, London, U.K., 6 pages (Year: 2013).*

EPO machine translation of DE 102016122001 (original DE document published May 17, 2018) (Year: 2018).*

* cited by examiner

METHOD FOR CONTROLLING THE POWER OUTPUT OF AN ELECTRICAL BATTERY DEVICE OF AN ELECTRICALLY DRIVEN VEHICLE

CROSS REFERENCE TO RELATED APPLICATIONS

This application claims benefit to German Patent Application No. DE 10 2017 102 054.3, filed Feb. 2, 2017, which is hereby incorporated by reference herein.

FIELD

The present invention relates to a method for controlling the power output of an electrical battery device of an electrically driven vehicle and to a control device for carrying out such a method.

BACKGROUND

It is known that vehicles have electrical battery devices for making available a solely electric drive for the vehicle. A decisive disadvantage of the known solutions is that the power output of an electrical battery device usually brings about heating of this electrical battery device. However, heating can extend into temperature ranges which would reduce the power output or result in damage to the battery device. Accordingly, such electrical battery devices usually have protection mechanisms in order to reduce the power output in the case of an excessively hot battery device, in order to avoid such damage.

The disadvantage described above leads, in particular in the case of racing vehicles in the form of electrically driven vehicles on racing circuits, to a situation in which the optimal power yield from the point of view of the electrical battery device cannot be achieved over the entire route profile of such a circular route. Instead, this leads to a situation in which, in particular at the start of a racing circuit which is embodied as a circular route, the driver of the electrically driven vehicle requests an excessively large power consumption with the result that in the further course of the route profile of the circular route the full power is no longer available so that when all the individual sections of the route profile are added the entire power output is reduced significantly. This becomes perceptible, in particular, in an increased circuit time for the circular route for the electrically driven vehicle.

SUMMARY

In an embodiment, the present invention provides a method for controlling a power output of an electrical battery device of an electrically driven vehicle. The method includes determining a route profile of a circular route for the vehicle; ascertaining at least one reduction section of the route profile with a reduced power demand; and reducing the power output of the electrical battery device when passing through the at least one reduction section.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
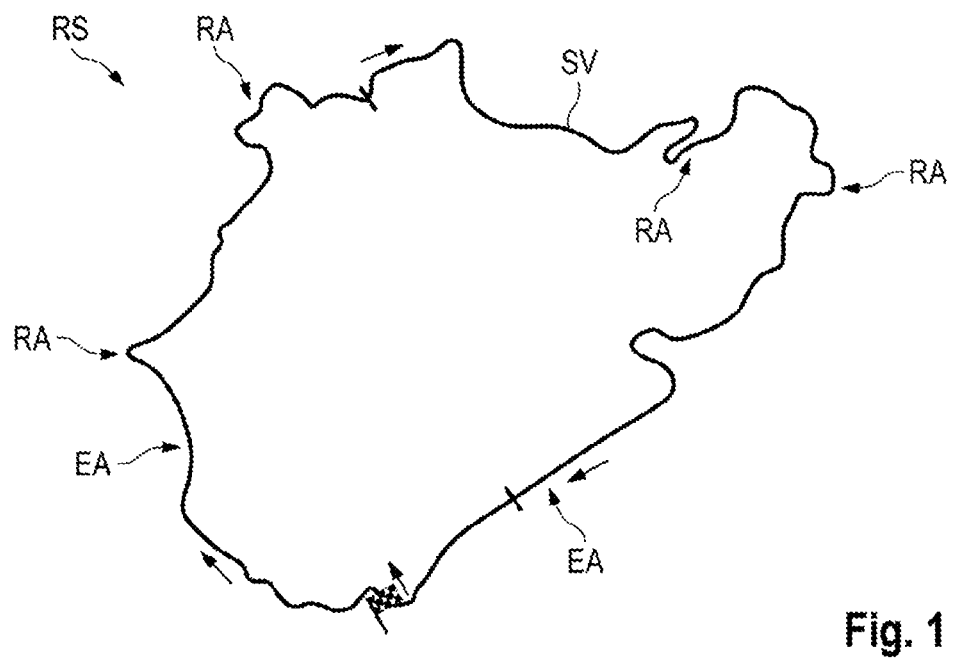
FIG. 1 shows a schematic illustration of a circular route.

Embodiments of the present invention described herein can at least partially overcome disadvantages described above. In particular, embodiments of the present invention make available in a cost-effective and simple way improved circuit times in the case of a route profile of a circular route.

A method for controlling the power output of an electrical battery device of an electrically driven vehicle is described herein. A method according to an embodiment of the invention has the following steps: determining a route profile of a circular route for the vehicle, ascertaining at least one reduction section of the route profile with a reduced power demand, and reducing the power output of the electrical battery device when passing through the at least one reduction section.

According to an embodiment of the invention, in a first step the route profile is therefore determined for the circular route for the vehicle. This can take place in an automated fashion as well as by corresponding inputting by the driver. It is therefore possible, for example, for data of the route profile of the circular route to be already be present stored in the vehicle. It is also conceivable for the data to be made available by the driver, for example via the driver's smartphone, in order to be stored in the vehicle in order to execute the method. Cloud-based or computer-assisted systems are also conceivable for making available the route profile of a circular route for the method in the vehicle. Last but not least it is also possible that, for example within the scope of an introduction circuit, the vehicle itself determines or measures the route profile of the circular route using, for example Geo sensors or GPS sensors.

As soon as the route profile of a circular route of a vehicle is known, this route profile can be checked for different qualities of the individual sections of the route profile of the circular route. Emphasis can be placed here in particular on the part of this route profile in which a reduced power demand is present owing to the actual road conditions or the actual profile of the route. This is clearly apparent from the example of a winding route profile. While, for example, on a long straight section of road the electrically driven vehicle is usually operated with the throttle fully open in order to achieve a maximum final speed, in a significantly more winding section of the route profile of the circular route a smaller power consumption is to be expected. In particular in a winding profile or when braking before a bend a significantly decreased power demand is present, with the result that in this part a decreased power consumption of the electrical battery device is possible.

Therefore, at least one reduction section of the route profile with a reduced power demand can be ascertained. Therefore, not only the entire route profile can be known as such but also at least one reduction section with a reduced power demand is known as part of this route profile for the last step. As soon as the vehicle then moves over the circular route, it is possible to track the position of the vehicle over the route profile or over the profile of the circular route using, for example, corresponding GPS sensors. As soon as the vehicle then passes through the reduction section, there is also a reduced power demand by definition according to the method according to the invention. This is achieved by the method according to the invention in that when passing through the at least one reduction section the power output of the electrical battery device is automatically reduced. This automatic reduction in the power output can preferably not be overridden or reversed by the driver. Instead, this involves a pre-setting of the vehicle for the actual power output which is made available by the electrical battery device to further electric motors within the electrically driven vehicle.

A method according to the invention therefore leads to a situation in which in defined reduction sections of the route profile the electrical battery device can, as it were, be spared in that precisely in these reduction sections the power output of the electrical battery device is reduced. So-called derating effects which would lead to power which is reduced by the system conditions of the battery device can in this way be avoided or at least reduced. In other words, precisely in the regions of the route profile of the circular route in which a reduced power demand has been ascertained in advance the electrical battery device is spared by the automatic reduction of the power output. This leads, in particular, to a situation in which in the other sections of the route profile the electrical battery device is made available with the full power output and so-called derating problems would not occur or would only occur to a small degree with the electrical battery device. In other words, as a result of the selective sparing of the electrical battery device the maximum possible power output can be optimized over the route profile of the circular route, with the result that an optimized power output is made available for the driver and correspondingly improved circuit times are possible over the route profile of the circular route.

A method according to the invention can be embodied, in particular, not only as a separate driving program for the circular route but can, for example, also be implemented as part of a sport program or of a sport plus program in the vehicle. In addition to the active switch-on facility by the driver of the vehicle, a GPS monitoring system of the vehicle can also enable supported, pre-stored racing circuits in the vicinity of the location of the vehicle in order to carry out a method according to the invention.

It can be advantageous if in a method according to the invention the at least one reduction section has at least one of the following route sections of the route profile: winding section, mountainous section, braking section, pit lane section, and straight section.

The enumeration above is not a conclusive list. Of course, the possible sections described above can also be combined with one another and taking into account in a quantitative fashion, in particular with respect to the actual power demand situations which are to be explained later. The above list contains, in particular, examples in which a reduced power consumption can be assumed on the basis of the actual route profile. In a winding section, the vehicle is usually driven with reduced speed, with the result that a reduced power demand is present. The same applies in a mountainous section, since the maximum speed of the vehicle is usually facilitated here with the assistance of the downhill force, with the result that a smaller power consumption of the battery device is necessary. The same applies in a braking section in which, for example, when braking before a winding section no power consumption or only a small amount of power consumption is necessary. As soon as a racing vehicle enters a pit lane in the course of a racing profile, a reduced power consumption can also be assumed, since there is usually a speed limit to be complied with there.

According to embodiments of the invention, a further advantage can be achieved if, for the at least one reduction section a power demand is ascertained which is used as the basis for the reduction in the power output when passing through the reduction section. This comprises, in particular, using it as a basis in a quantitative fashion for the reduction in the power output. In other words, reduction sections can be analyzed in a quantitative fashion, with the result that, for example, reduction sections with a relatively low power demand can be differentiated from reduction sections with a relatively high power demand. The actual reduction in the power output can then be used as the basis for the actual reduction in the power output in a quantitative fashion with respect to the ascertained power demand. It is therefore also possible to use quantitatively and qualitatively different types of reduction sections in a method according to the invention.

Furthermore, according to embodiments of the invention, it can be advantageous if a power profile, in particular in the form of a power envelope curve, is determined on the basis of the route profile and the determined at least one reduction section and used as the basis for the reduction in the power output when passing through the at least one reduction section. In other words, not only is an abstract power demand made available or ascertained in advance for the respective reduction section, but instead the entire power profile is ascertained in advance, in particular for the entire route profile. In other words, the power profile for travel through the entire route profile can be provided, with the result that real-time generation is no longer necessary. In this context, the power profile for the corresponding route profile can already have been determined in advance, if, in particular, the route profile for the corresponding circular route has already been stored beforehand in the vehicle. The provision of a power envelope curve also permits the method to deal with detailed situations such as, for example, the driving behavior of the driver, the weather or the like, in order to make available a certain degree of flexibility for the power consumption, for example in special situations or overtaking situations.

It is also advantageous if with a method according to an embodiment of the invention the power profile is determined in such a way that the electrical battery device has a standard operating state at the end of the route profile. A standard operating state is to be understood here as meaning, in particular, the operating state of the electrical battery device in which the normal operation of the battery device is possible. In particular, this relates to the derating state or the temperature status of the electrical battery device. Therefore, if the power profile is determined in advance for the entire route profile in such a way that a standard battery status is achieved at the end of the route profile, this leads to a situation in which any desired number of circuits of the route profile of the circular route can be traveled through precisely with this ascertained power profile without the need to make changes to the actual power profile from one circuit to another. In other words, by ascertaining the normal operating status the vehicle or the electrical battery device is, as it were, set to zero for the following circuit on the circular route of the route profile. Therefore, any desired number of circuits is conceivable, wherein a reproducible power consumption can be used for driving on each individual circuit of the circular route.

Furthermore, it is advantageous if with a method according to an embodiment of the invention the power profile is determined for a last circuit of the route profile in such a way that a maximum power output is possible over the route profile. If, for example, a race is run over several circuits of a circular route, a separate mode with the term "last circuit" can be switched on. However, in contrast to the embodiment according to the previous paragraph this gives rise to a situation in which the electrical battery device is in fact no longer in a normal operating status at the end of this last circuit. In other words, for the maximum power output of this last circuit it is accepted that at the end of this last circuit of the route profile a reduced power output or even switching off of the electrical battery device becomes necessary. This maximization of the power for the last circuit makes it possible still to be able to activate a final spurt for the execution of the entire race in the last round.

Likewise it is advantageous if in a method according to an embodiment of the invention the at least one reduction section and/or the reduction in the power output is conveyed on a current basis and/or as a preview as information to a driver of the vehicle. This conveying of information occurs, in particular, within the scope of a display device inside the vehicle. It is therefore possible to make available a corresponding display, for example in the combination instrument. Further sensor displays, for example the acoustic playback, are also conceivable within the scope of the present invention and increase the possibility of the method according to the invention being easily followed by the driver of the vehicle.

A further advantage can be achieved if with a method according to an embodiment of the invention at least one elevated section of the route profile with an increased power demand is determined, wherein when passing through the at least one elevated section the power output of the electrical battery device is increased. The elevated section is therefore a region which is configured in a contrary fashion to the reduction section. For example, said section can comprise relatively long straight sections of road or uphill passages in which it can be assumed that there will be an increased power demand of the electrically driven vehicle. Therefore, in addition to the described protection in a method according to the invention, further improvement of the circuit times is possible.

It is also advantageous if with a method according to an embodiment of the invention, a safety factor is taken into account during the reduction of the power output when passing through the at least one reduction section. This safety factor makes it possible to provide, in particular within the scope of a power envelope curve, a sufficient degree of safety with respect to the actual power output, on the one hand, and/or the chronological interaction of the reduction in the power output. For example, the safety factor can serve to ensure that the power output is already reduced at a certain safety interval or with a certain safety time before the reduction section is reached. In particular, incorrect information or reduced detail accuracy during the ascertaining of the position of the vehicle on the circular route can in this way be effectively and easily compensated.

A control device for controlling the power output of an electrical battery device of an electrically driven vehicle is provided according to the invention. A control device according to the invention can have a determining unit for determining a route profile of a circular route for the vehicle. Furthermore, an ascertaining unit is provided for ascertaining at least one reduction section of the route profile with a reduced power demand. A reduction in the power output of the electrical battery device when passing through the at least one reduction section is carried out by means of a reduction unit. The determining unit, the ascertaining unit and/or the reduction unit are designed here, in particular, to carry out a method according to the invention. Therefore, a control device according to the invention provides the same advantages as have been explained in detail with respect to a method according to the invention.

From FIG. 1 it is clearly apparent how a possible route profile SV for a circular route RS can appear. The route profile SV is represented here as a continuous line and can be divided into a very different route sections. Therefore, for example a relatively long straight section of road and a bend with a long curve can be seen on the left-hand side in the route profile SV of the circular route RS. In the profile of this route these two sections are defined as elevated sections EA in which it can be assumed there will be an increased power consumption of an electrical battery device 110 of the vehicle 100. In addition to the relatively long straight sections of road, in the case of the circular route RS in FIG. 1 in the route profile SV a multiplicity of winding sections can also be seen. Here, for example four individual corresponding route sections are characterized as reduction sections RA which, with pronounced winding sections or with a multiplicity of individual bends, indicate a relatively low power consumption in these reduction sections RA.

Figure 2:
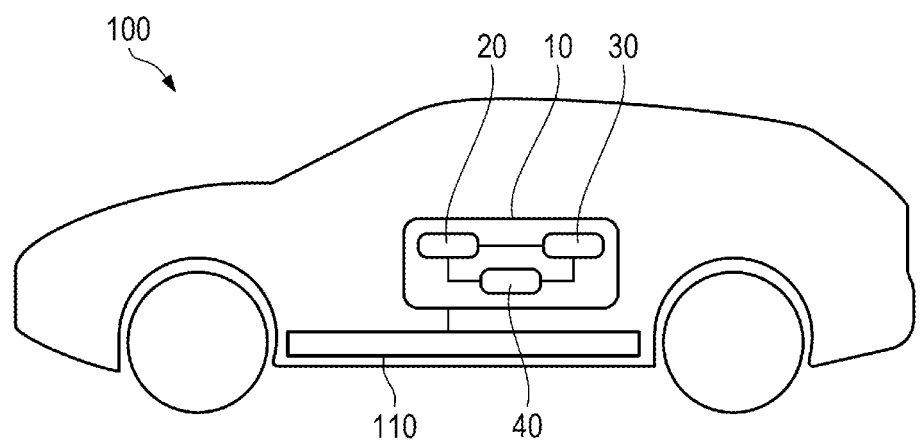
FIG. 2 shows a control device according to an embodiment of the invention in a vehicle.

In order to be able to carry out optimization of the circuit times on the basis of a route profile SV as is shown in FIG. 1 for a circular route RS, a control device 10 according to FIG. 2 is provided in a vehicle 100. This control device 10 has a determining unit 20 with which the route profile SV according to FIG. 1 can be determined. This determination can occur, for example, by means of a first introduction circuit and a corresponding measurement or determination of the position profile of the vehicle 100. However, it is, of course, also conceivable for a data record according to FIG. 1 to be input or read into the vehicle 100, into the determining unit 20 there.

At least one reduction section RA and, in particular, one or more elevated sections EA are then also determined on the basis of the information of the route profile SV in FIG. 1 using an ascertaining unit 30. As a result, a map is obtained as is shown in FIG. 1. This map has not only the route profile SV of the circular route RS alone but instead also already has an at least qualitative evaluation with respect to the reduction sections RA and the elevated sections EA for the route profile SV. With this additional information, the reduction unit 40 will then be able to intervene in the power consumption of the electrical battery device 110 in a regulating fashion.

Figure 3:
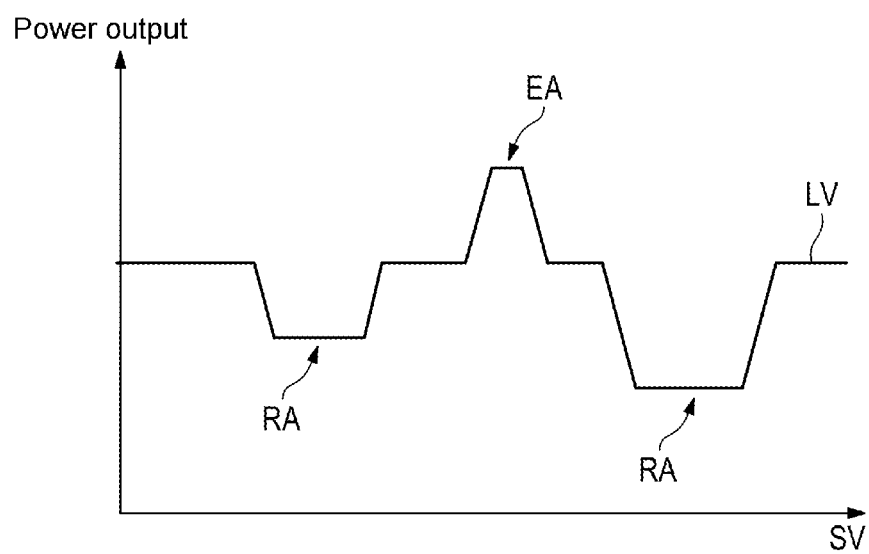
FIG. 3 shows an example of a power profile.

FIG. 3 shows a schematic view of how a power profile LV can give rise to differences not only qualitatively but also even quantitatively. The power profile LV over the route profile SV is provided here by way of example with two reduction sections RA and an elevated section EA. The power output therefore firstly runs constantly from right to left and when it has reached the first reduction section RA with a reduced power output. As soon as the end of the first reduction section RA is reached, the power output is increased again to the normal status. In the meantime, a relatively large and long straight section of road is traveled through, with the result that an increase in the power output during the travel through the elevated section EA is predetermined. Finally, a second reduction section RA is reached which necessitates an even further reduced power output, for example as a result of a very winding profile of the route profile SV in this reduction section RA. Finally, the power output along the power profile LV is reduced to the normal mode again.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for controlling a power output of an electrical battery device of an electrically driven vehicle, the method comprising:
   determining a route profile of a circular route for the vehicle;
   determining one or more individual sections of the route profile of the circular route;
   identifying at least one of the one or more individual sections of the route profile as a reduction section, wherein the at least one reduction section is identified by a reduced power demand to be present, the reduced power demand owing to actual road conditions and/or an actual section profile;
   determining a power envelope curve that specifies, for each of the one or more individual sections of the route profile, a power output limit for the electrical battery device, wherein the power envelope curve is determined based on the route profile and the at least one reduction section;
   traveling, by the vehicle, over the circular route; and
   limiting, when passing through each respective one of the one or more individual sections of the route profile, the power output of the electrical battery device to the power output limit specified by the power envelope curve for each respective individual section,
   wherein determining the route profile of the circular route for the vehicle includes selecting the route profile of the circular route from a collection of route profiles stored by a cloud-based system.

2. The method as claimed in claim 1, wherein the actual road conditions or the actual profile to which the reduced power demand is owed are one of the following: a winding section, a mountainous section, a braking section, a pit lane section, or a straight section.

3. The method as claimed in claim 1, wherein for each respective one of the one or more individual sections of the route profile, a power demand to be present is ascertained which is used in a quantitative fashion as a basis for determining the power output limit for the electrical battery device when passing through the respective individual section of the route profile.

4. The method as claimed in claim 1, further comprising determining, based on the route profile and the at least one reduction section, a final circuit power envelope curve that specifies, for each of the one or more individual sections of the route profile, a power output limit for the electrical battery device.

5. The method as claimed in claim 1, wherein the at least one reduction section and/or the power output limit for the electrical battery device specified by the power envelope curve is conveyed on a current basis and/or as a preview to a driver of the vehicle.

6. The method as claimed in claim 1, further comprising identifying at least one of the one or more individual sections of the route profile as an elevated section, wherein the at least one elevated section is identified by an increased power demand to be present, the increased power demand owing to at least one of actual road conditions or an actual section profile.

7. The method as claimed in claim 1, wherein the power output limit specified by the power envelope curve for each respective individual section cannot be overridden by a driver command.

8. The method as claimed in claim 1, wherein limiting, when passing through each respective one of the one or more individual sections of the route profile, the power output of the electrical battery device to the power output limit specified by the power envelope curve for each respective individual section includes:
   identifying a respective one of the one or more individual sections of the route profile through which the vehicle is passing by using a GPS sensor, and
   limiting the power output of the electrical battery device to the power output limit specified by the power envelope curve for the section identified using the GPS sensor.

9. The method as claimed in claim 1, wherein determining the route profile of the circular route for the vehicle includes selecting a route profile of the circular route from a collection of route profiles stored by the cloud-based system and determined as being in a vicinity of the vehicle by a GPS monitoring system of the vehicle.

10. A control device for controlling the power output of an electrical battery device of an electrically driven vehicle, the control device comprising:
   a controller configured to:
      determine a route profile of a circular route for the vehicle,
      determine one or more individual sections of the route profile of the circular route,
      identify at least one of the one or more individual sections of the route profile as a reduction section, wherein the at least one reduction section is identified by a reduced power demand to be present, the reduced power demand owing to actual road conditions and/or an actual section profile,
      determine a power envelope curve that specifies, for each of the one or more individual sections of the route profile, a power output limit for the electrical battery device, wherein the power envelope curve is determined based on the route profile and the at least one reduction section; and limit, while the vehicle is passing through each respective one of the one or more individual sections of the route profile, the power output of the electrical battery device to the power output limit specified by the power envelope curve for each respective individual section, wherein determining the route profile of the circular route for the vehicle includes selecting the route profile of the circular route from a collection of route profiles stored by a cloud-based system.

11. A method for controlling a power output of an electrical battery device of an electrically driven vehicle, the method comprising:

determining a route profile of a circular route for the vehicle;

determining one or more individual sections of the route profile of the circular route;

identifying at least one of the one or more individual sections of the route profile as a reduction section, wherein the at least one reduction section is identified by a reduced power demand to be present, the reduced power demand owing to actual road conditions and/or an actual section profile;

determining a power envelope curve that specifies, for each of the one or more individual sections of the route profile, a power output limit for the electrical battery device, wherein the power envelope curve is determined based on the route profile and the at least one reduction section;

traveling, by the vehicle, over the circular route; and limiting, when passing through each respective one of the one or more individual sections of the route profile, the power output of the electrical battery device to the power output limit specified by the power envelope curve for each respective individual section, wherein the at least one reduction section and/or the power output limit for the electrical battery device specified by the power envelope curve is conveyed on a current basis and/or as a preview to a driver of the vehicle, and wherein the at least one reduction section and/or the power output limit for the electrical battery device specified by the power envelope curve is conveyed on a current basis and/or as a preview to a driver of the vehicle acoustically or on a display of the vehicle.

* * * * *